United States Patent
Evans

(10) Patent No.: US 10,167,239 B2
(45) Date of Patent: Jan. 1, 2019

(54) PELLETED FEATHER MEAL AND SOYBEAN MEAL BASED ORGANIC FERTILIZER

(71) Applicant: True Organic Products, Inc., Helm, CA (US)

(72) Inventor: Jacob Matthew Evans, Pebble Beach, CA (US)

(73) Assignee: True Organic Products, Inc., Helm, CA (US)

( * ) Notice: Subject to any disclaimer, the term of this patent is extended or adjusted under 35 U.S.C. 154(b) by 62 days.

(21) Appl. No.: 15/253,298

(22) Filed: Aug. 31, 2016

(65) Prior Publication Data
US 2018/0057418 A1    Mar. 1, 2018

(51) Int. Cl.
C05F 1/00 (2006.01)
C05G 3/00 (2006.01)

(52) U.S. Cl.
CPC ............ C05F 1/005 (2013.01); C05G 3/0058 (2013.01)

(58) Field of Classification Search
CPC .............................. C05F 1/005; C05G 3/0058
USPC ......................................................... 426/635
See application file for complete search history.

(56) References Cited

U.S. PATENT DOCUMENTS

| | | | | |
|---|---|---|---|---|
| 3,249,441 A | * | 5/1966 | Reynolds | A23K 40/10 426/630 |
| 2008/0160522 A1 | * | 7/2008 | Lee | C12Q 1/689 435/6.16 |
| 2008/0260902 A1 | * | 10/2008 | Van Houten | A23D 9/00 426/18 |
| 2016/0235093 A1 | * | 8/2016 | Brion | A23K 40/00 |

OTHER PUBLICATIONS

Azeus. "How to regulate the hardness of pellet feed" Jun 23, 2015 pp. 1-3 <http://www.feedpelletizer.com/application/how-to-regulate-feed-pellet-hardness.html>.*
Gibb, D. J., T. J. Klopfenstein, and M. H. Sindt. "Combinations of rendered protein meals for growing calves." Journal of animal science 70.8 (1992): 2581-2589.*

* cited by examiner

*Primary Examiner* — Jennifer A Smith
(74) *Attorney, Agent, or Firm* — Hawley Troxell Ennis & Hawley LLP; Philip McKay

(57) ABSTRACT

A process for production of a pelleted feather meal and soybean meal based organic fertilizer includes combining feather meal and soybean meal to create a combination of feather meal and soybean meal and processing the combination of feather meal and soybean meal into pellets. In one embodiment, the pelleted feather meal and soybean meal based organic fertilizer includes meat and bone meal.

19 Claims, 5 Drawing Sheets

PELLETED FEATHER MEAL AND SOYBEAN MEAL BASED ORGANIC FERTILIZER

BACKGROUND

Over the years, a number of different types of fertilizer compositions have been developed and employed in agriculture. Traditionally, synthetic chemical fertilizer compositions have dominated the fertilizer marketplace. More recently, however, the public has become increasingly aware and concerned about the links between synthetic chemical fertilizer use, environmental degradation, and human illness. For instance, the public is becoming more aware that synthetic chemical fertilizers contain poisons, pollute water, destroy microbes in the soil, lose half their value due to runoff, burn roots, require significant amounts of water, contain less micro-nutrition, and are heavily laden with salt.

Consequently, there has been a significant movement toward fertilizer compositions that are suitable for use in United States Department of Agriculture certified organic crop production. These fertilizer compositions are typically derived from natural sources and do not rely on synthetic chemicals. Unlike synthetic products, organic fertilizers encourage the growth of microorganisms, which break down old plant material and convert nutrients into food. Consequently, over time, the use of organic fertilizers results in healthier and more fertile soil, which leads to hardier and more robust plants.

Furthermore, consumers are more concerned about health and the environment than ever before and are making purchasing decisions based upon those concerns. As a result, more and more consumers are purchasing organic foods. Studies show that many consumers who purchase organic foods do so because they wish to avoid toxic and persistent pesticides and fertilizers.

Due to the increased demand for organic fertilizer compositions, there is significant interest in developing better organic fertilizer compositions that provide nutrients and reduce the risk of introducing pathogens into the food supply.

Desirable nutrients include, but are not limited to, bioavailable phosphorous, potassium, and nitrogen. These nutrients must not only be present in the fertilizer, but also must be present in sufficient concentrations to benefit agricultural vegetation. In addition, the organic fertilizer compositions must be in a form that is readily applied to the agricultural vegetation and/or has minimum impact on the surrounding community. Problematically, many currently available organic fertilizers have low values of phosphorous, potassium, and nitrogen. So low, in fact, that an inconvenient amount of fertilizers must be applied to crops for the crops to receive an acceptable amount of these nutrients.

There is a current need for an environmentally benign fertilizer derived from a natural organic source that provides sufficient levels of usable nutrients in a manageable amount of fertilizer without requiring significant processing or raising environmental concerns.

SUMMARY

In accordance with one embodiment, a process of manufacturing a pelleted feather meal and soybean meal based organic fertilizer product is disclosed. As will be discussed herein, the pelleted feather meal and soybean meal based organic fertilizer product provides higher levels of nitrogen than is common in organic fertilizers, which means that less fertilizer than is typical of organic fertilizers must be spread to provide an appropriate amount of nitrogen to various crops. Thus, the amount of pelleted feather meal and soybean meal based organic fertilizer product that must be spread to be an effective nitrogen source is limited.

Furthermore, because significant amounts of nitrogen are provided per pound of fertilizer, other materials may be easily included in the pelleted feather meal and soybean meal based organic fertilizer product to introduce the presence of various other macro- and micronutrients.

For example, through experimentation and to his surprise, the Inventor has realized that the feather meal and soybean meal based organic fertilizer product may consist of up to 30% other materials and still provide sufficient amounts of available nitrogen to crops. Indeed, the high level of nitrogen in pelleted feather meal and soybean meal based organic fertilizer product allows adding other materials that would otherwise be inconvenient and inefficient to add as the nitrogen level of the final fertilizer would be too low.

As a result of this high nitrogen level, the pelleted feather meal and soybean meal based organic fertilizer product may be customized for particular growing conditions, soil, crops, and growers.

In one embodiment, the process of manufacturing a pelleted feather meal and soybean meal based organic fertilizer product includes obtaining feather meal. Made of poultry feathers, feather meal is a poultry processing byproduct in one embodiment. Problematically, the bioavailability of nitrogen in this waste product is often low and feather meal also lacks phosphorus and potassium.

In one embodiment, the process of manufacturing a pelleted feather meal and soybean meal based organic fertilizer product includes obtaining soybean meal. In one embodiment, soybean meal is produced from soybeans and is often used in animal feeds.

In one embodiment, the process of manufacturing a pelleted feather meal and soybean meal based organic fertilizer product includes obtaining meat and bone meal. In one embodiment, meat and bone meal is a byproduct of animal rendering and is commonly used as an animal feed and in power production.

By combining two or more of feather meal, soybean meal, and meat and bone meal, an organic fertilizer can be ultimately produced that overcomes the shortcomings of each of the individual meals, resulting in an easily customizable, high nitrogen product.

In one embodiment, at least a portion of the feather meal and at least a portion of the soybean meal are conveyed into a mixing container. In one embodiment, the at least a portion of the feather meal and the at least a portion of the soybean meal are mixed to create an ingredients blend.

In one embodiment, at least a portion of the feather meal, at least a portion of the soybean meal, and at least a portion of the meat and bone meal are conveyed into a mixing container. In one embodiment, the at least a portion of the feather meal, the at least a portion of the soybean meal, and the at least a portion of the meat and bone meal are mixed to create an ingredients blend.

In one embodiment, the ingredients blend is filtered to create a filtered blend. In one embodiment, the filtered blend is transferred to a conditioning unit.

In one embodiment, the filtered blend is heated to a minimum of 130 degrees Fahrenheit in the conditioning unit to create a conditioned blend. In one embodiment, the conditioned blend is transferred to a pellet mill.

In one embodiment, the conditioned blend is processed in the pellet mill to create the pelletized blend. In one embodiment, the pelletized blend is transferred to a dryer.

In one embodiment, the pelletized blend is heated in the dryer to create a heated pelletized blend. In one embodiment, the heated pelletized blend is allowed to cool in the dryer.

In one embodiment, the heated pelletized blend is transferred to a cooler. In one embodiment, the heated pelletized blend is cooled in the cooler to a moisture level range of 4% to 20% by passing purified ozonated air through the heated pelletized blend to create cooled pellets.

In one embodiment, the cooled pellets are filtered to create a pellet product. In one embodiment, the pellet product is transferred to a storage and/or shipping container. In one embodiment, the pellet product is tested for pathogens.

In one embodiment, the pellet product is applied to soil supporting crop growth. In one embodiment, the pellet product is applied to soil that will support crop growth.

Using the process for production of a feather meal and soybean meal based organic fertilizer product disclosed herein, a pelleted feather meal and soybean meal based organic fertilizer product is provided that is environmentally benign; is non-pathogenic; is derived from a natural organic source; does not require significant processing; has minimal odor; can be applied directly to soil supporting agricultural vegetation; is easily handled and transported; includes time-released nitrogen components which become bioavailable to agricultural vegetation by beneficial microbial digestion in soil; and eliminates chemical crop burning.

As discussed in more detail below, using the below embodiments, with little or no modification and/or user input, there is considerable flexibility, adaptability, and opportunity for customization to meet the specific needs of various users under numerous circumstances.

Figure 1:
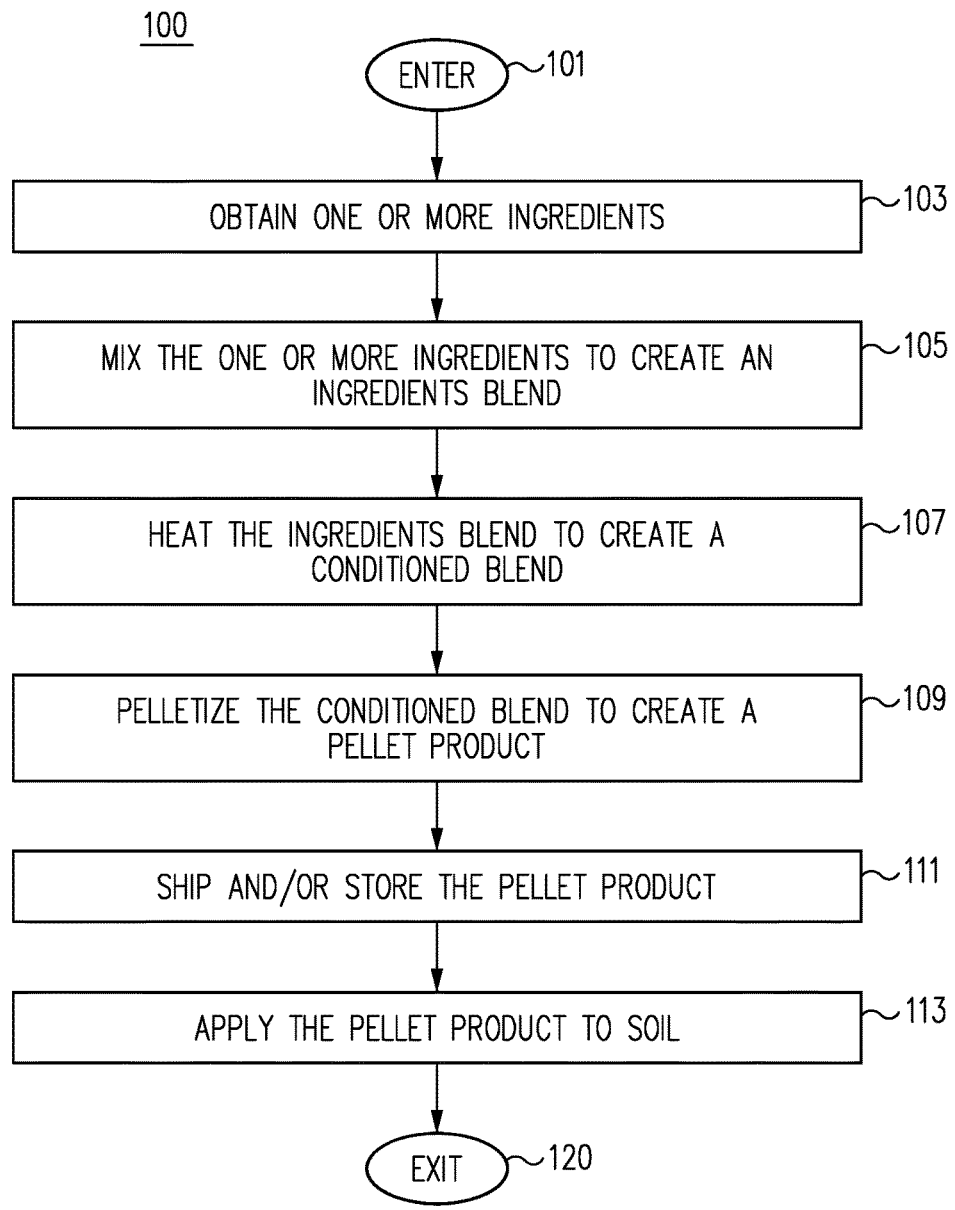
FIG. 1 is a flow chart of a process for organic agricultural fertilization using a pelleted feather meal and soybean meal based organic fertilizer product, in accordance with one embodiment.

Common reference numerals are used throughout the figures and the detailed description to indicate like elements. One skilled in the art will readily recognize that the above figures are examples and that other processes, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict exemplary embodiments. Embodiments may be embodied in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a process for organic fertilization using a pelleted feather meal and soybean meal based organic fertilizer product includes creating a pelleted feather meal and soybean meal based organic fertilizer product and applying the pelleted feather meal and soybean meal based organic fertilizer product to the fields/soil/substrate supporting agricultural vegetation as a method of organic fertilization of the agricultural vegetation.

As used herein, the term "feather meal" includes a poultry processing byproduct comprised of poultry feathers.

The term "soybean meal" includes meals produced from soybeans.

The term "meat and bone meal" includes meals produced as a byproduct of animal rendering.

As used herein, the term "organic fertilizer" means an ingredient or product that may be used in certified organic crop production in accordance with USDA National Organic Program standards.

Currently, 7 CFR 205.203 provides the practice standard for certified organic crop production. The regulations under 7 CFR 205.203 provide the following:

(a) The producer must select and implement tillage and cultivation practices that maintain or improve the physical, chemical, and biological condition of soil and minimize soil erosion.

(b) The producer must manage crop nutrients and soil fertility through rotations, cover crops, and the application of plant and animal materials.

(c) The producer must manage plant and animal materials to maintain or improve soil organic matter content in a manner that does not contribute to contamination of crops, soil, or water by plant nutrients, pathogenic organisms, heavy metals, or residues of prohibited substances. Animal and plant materials include:

(1) Raw animal manure, which must be composted unless it is:

(i) Applied to land used for a crop not intended for human consumption;

(ii) Incorporated into the soil not less than 120 days prior to the harvest of a product whose edible portion has direct contact with the soil surface or soil particles; or (iii) Incorporated into the soil not less than 90 days prior to the harvest of a product whose edible portion does not have direct contact with the soil surface or soil particles;

(2) Composted plant and animal materials produced through a process that:

(i) Established an initial C:N ratio of between 25:1 and 40:1; and (ii) Maintained a temperature of between 131° F. and 170° F. for 3 days using an in-vessel or static aerated pile system; or (iii) Maintained a temperature of between 131° F. and 170° F. for 15 days using a windrow composting system, during which period, the materials must be turned a minimum of five times.

(3) Uncomposted plant materials.

(d) A producer may manage crop nutrients and soil fertility to maintain or improve soil organic matter content in a manner that does not contribute to contamination of crops, soil, or water by plant nutrients, pathogenic organisms, heavy metals, or residues of prohibited substances by applying:

(1) A crop nutrient or soil amendment included on the National List of synthetic substances allowed for use in organic crop production;

(2) A mined substance of low solubility;

(3) A mined substance of high solubility: Provided, That, the substance is used in compliance with the conditions established on the National List of nonsynthetic materials prohibited for crop production;

(4) Ash obtained from the burning of a plant or animal material, except as prohibited in paragraph (e) of this section: Provided, That, the material burned has not been treated or combined with a prohibited substance or the ash is not included on the National List of nonsynthetic substances prohibited for use in organic crop production; and (5) A plant or animal material that has been chemically altered by a manufacturing process: Provided, that, the material is included on the National List of synthetic substances allowed for use in organic crop production established in §205.601.

(e) The producer must not use:

(1) Any fertilizer or composted plant and animal material that contains a synthetic substance not included on the National List of synthetic substances allowed for use in organic crop production;

(2) Sewage sludge (biosolids) as defined in 40 CFR part 503; and (3) Burning as a means of disposal for crop residues produced on the operation: Except, That, burning may be used to suppress the spread of disease or to stimulate seed germination.

FIG. 1 shows a flow chart of a process for organic agricultural fertilization using a pelleted feather meal and soybean meal based organic fertilizer product 100, in accordance with one embodiment. As shown in FIG. 1, the process for organic agricultural fertilization using a pelleted feather meal and soybean meal based organic fertilizer product 100 begins at ENTER OPERATION 101 and process flow proceeds to OBTAIN ONE OR MORE INGREDIENTS OPERATION 103.

In one embodiment, at OBTAIN ONE OR MORE INGREDIENTS OPERATION 103, a quantity of feather meal is obtained. In one embodiment, at OBTAIN ONE OR MORE INGREDIENTS OPERATION 103, a quantity of soybean meal is obtained. In one embodiment, at OBTAIN ONE OR MORE INGREDIENTS OPERATION 103, a quantity of meat and bone meal is obtained.

In one embodiment, once one or more ingredients are obtained at OBTAIN ONE OR MORE INGREDIENTS OPERATION 103, process flow proceeds to MIX THE ONE OR MORE INGREDIENTS TO CREATE AN INGREDIENTS BLEND OPERATION 105.

In one embodiment, once the one or more ingredients are mixed to create an ingredients blend at MIX THE ONE OR MORE INGREDIENTS TO CREATE AN INGREDIENTS BLEND OPERATION 105, process flow proceeds to HEAT THE INGREDIENTS BLEND TO CREATE A CONDITIONED BLEND OPERATION 107.

In one embodiment, once the ingredients blend is heated to create a conditioned blend at HEAT THE INGREDIENTS BLEND TO CREATE A CONDITIONED BLEND OPERATION 107, operation flow proceeds to PELLETIZE THE CONDITIONED BLEND TO CREATE A PELLET PRODUCT OPERATION 109.

In one embodiment, once the conditioned blend is pelletized to create a pellet product at PELLETIZE THE CONDITIONED BLEND TO CREATE A PELLET PRODUCT OPERATION 109, process flow proceeds to SHIP AND/OR STORE THE PELLET PRODUCT OPERATION 111.

In one embodiment, once the pellet product is shipped and/or stored at SHIP AND/OR STORE THE PELLET PRODUCT OPERATION 111, operation flow proceeds to APPLY THE PELLET PRODUCT TO SOIL OPERATION 113.

Depending on the particular agricultural vegetation requirements, the application rate of the pellet product at APPLY THE PELLET PRODUCT TO SOIL OPERATION 113 may be anywhere in a range of approximately 200 to 10,000 pounds per acre.

In one embodiment, once the pellet product is applied to the soil at APPLY THE PELLET PRODUCT TO SOIL OPERATION 113, process flow proceeds to EXIT OPERATION 120 and the process for organic agricultural fertilization using a pelleted feather meal and soybean meal based organic fertilizer product 100 is exited.

Using the process for organic agricultural fertilization using a pelleted feather meal and soybean meal based organic fertilizer product 100, a pelleted feather meal and soybean meal based organic fertilizer product organic fertilizer product is provided that is environmentally benign; is non-pathogenic; is derived from natural organic sources; does not require significant processing; has minimal odor; is easily handled and applied in pellet form; can be applied directly to soil supporting agricultural vegetation; includes time-released nitrogen components which become bioavailable to agricultural vegetation by beneficial microbial digestion in soil; and eliminates chemical crop burning.

Figure 2A:
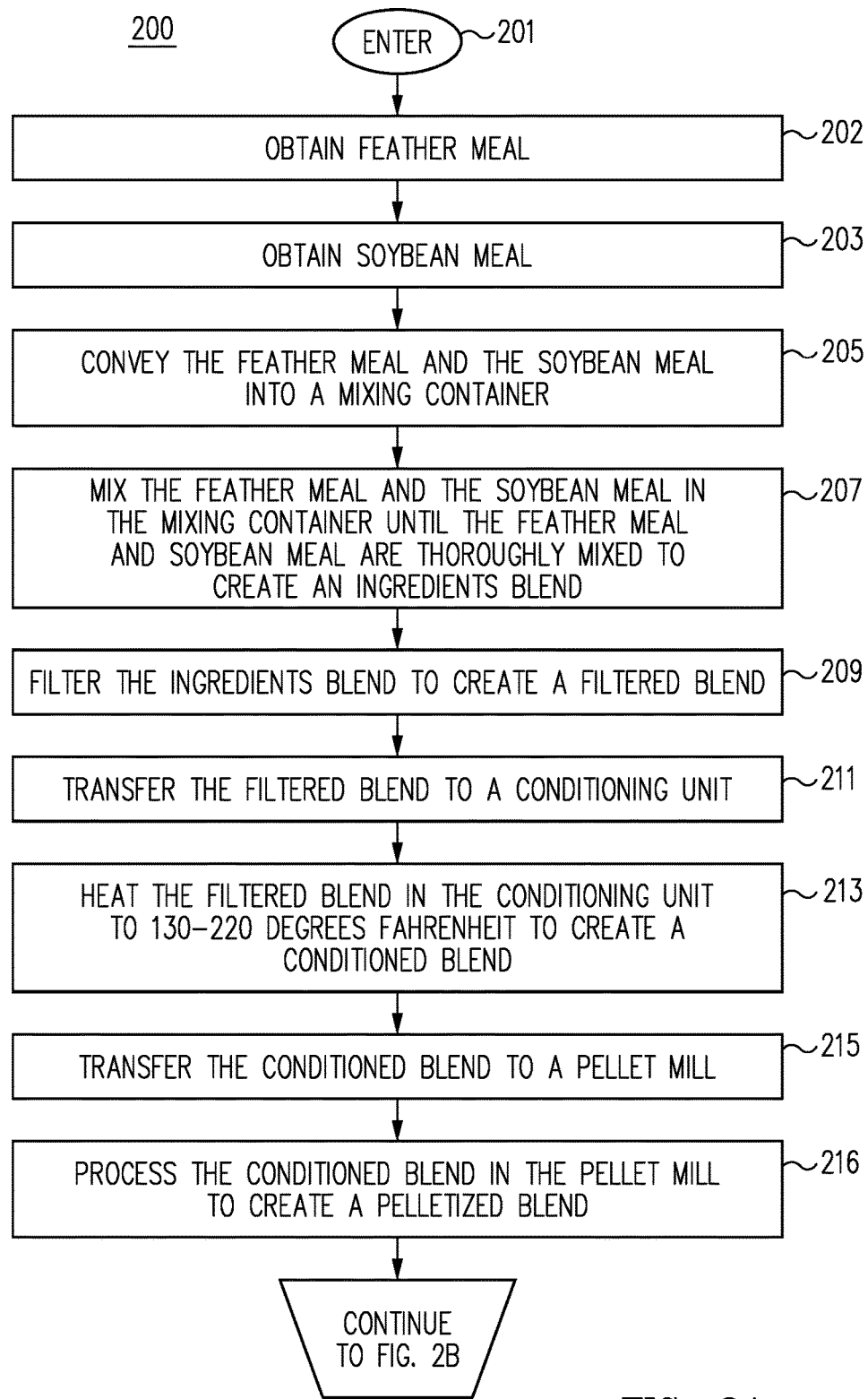
FIGS. 2A and 2B are a flow chart of a process for creating a pelleted feather meal and soybean meal based organic fertilizer product, in accordance with one embodiment.
Figure 2B:
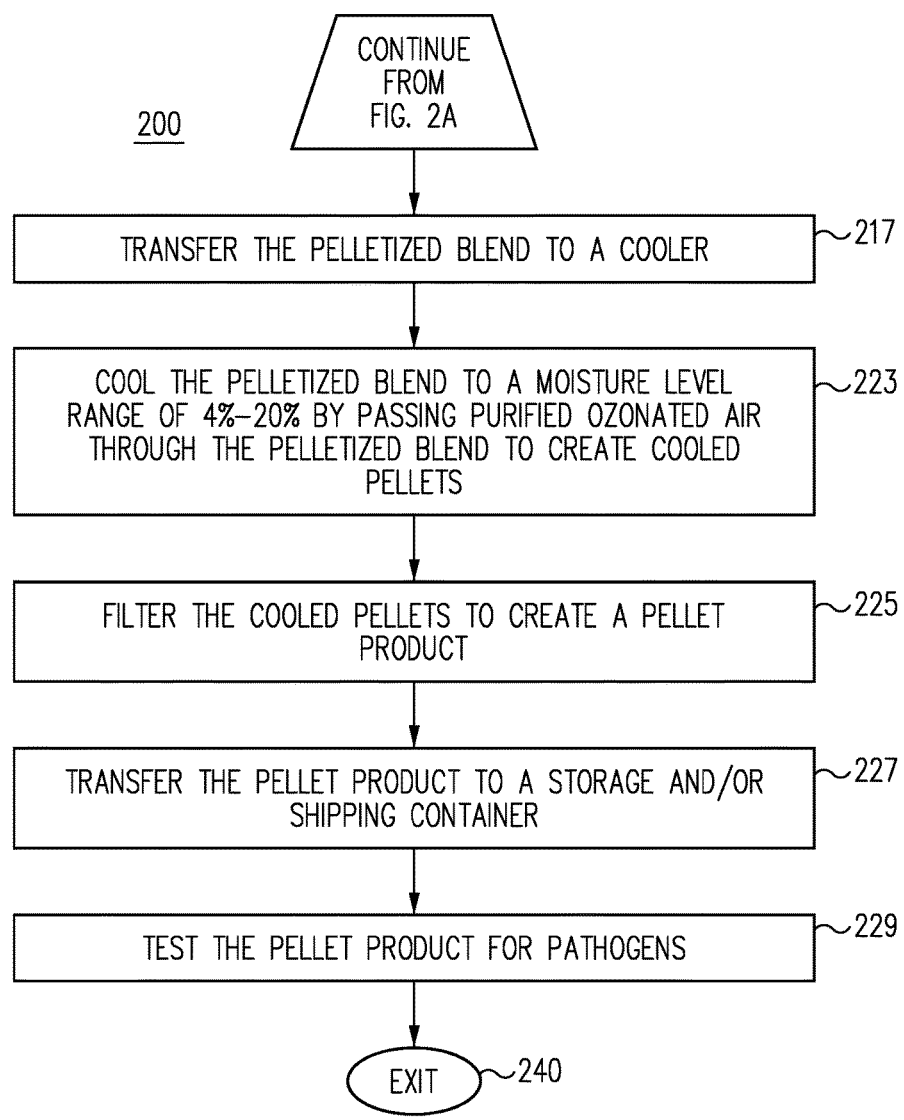

FIGS. 2A and 2B are a flow chart of a process for creating a pelleted feather meal and soybean meal based organic fertilizer product from feather meal and soybean meal, in accordance with one embodiment. As shown in FIG. 2A, a process for creating a pelleted feather meal and soybean meal based organic fertilizer product from feather meal and soybean meal 200 begins at ENTER OPERATION 201 and process flow proceeds to OBTAIN FEATHER MEAL OPERATION 202.

In one embodiment, the feather meal of OBTAIN FEATHER MEAL OPERATION 202 includes a poultry processing byproduct comprised of poultry feathers.

In one embodiment, once the feather meal is obtained at OBTAIN FEATHER MEAL OPERATION 202, process flow proceeds to OBTAIN SOYBEAN MEAL OPERATION 203.

In one embodiment, the soybean meal of OBTAIN SOYBEAN MEAL OPERATION 203 is produced from soybeans.

In one embodiment, once the soybean meal is obtained at OBTAIN SOYBEAN MEAL OPERATION 203, process flow proceeds to CONVEY THE FEATHER MEAL AND THE SOYBEAN MEAL INTO A MIXING CONTAINER OPERATION 205.

In one embodiment, at CONVEY THE FEATHER MEAL AND THE SOYBEAN MEAL INTO A MIXING CONTAINER OPERATION 205, at least a portion of the feather meal and at least a portion of the soybean meal are conveyed into the mixing container.

In one embodiment, the amount of the feather meal and the amount of the soybean meal are conveyed in quantities such that the resulting combination of the feather meal and the soybean meal is approximately 50% feather meal and approximately 50% soybean meal. In one embodiment, the resulting combination is approximately 35% feather meal and approximately 35% soybean meal. In one embodiment, the resulting combination of the feather meal and the soybean meal is less than 99% of the feather meal. In one embodiment, the resulting combination of the feather meal and the soybean meal is less than 99% of the soybean meal.

In other embodiments, the feather meal and the soybean meal are conveyed in quantities such that the resulting combination of the feather meal and the soybean meal is any desired percentage concentration of the feather meal and the soybean meal, typically as determined by cost and the specific needs of the user.

In one embodiment, once the feather meal and the soybean meal are conveyed into the mixing container at CONVEY THE FEATHER MEAL AND THE SOYBEAN MEAL INTO A MIXING CONTAINER OPERATION 205, process flow proceeds to MIX THE FEATHER MEAL AND THE SOYBEAN MEAL IN THE MIXING CONTAINER UNTIL THE FEATHER MEAL AND SOYBEAN MEAL ARE THOROUGHLY MIXED TO CREATE AN INGREDIENTS BLEND OPERATION 207.

According to one embodiment, at MIX THE FEATHER MEAL AND THE SOYBEAN MEAL IN THE MIXING CONTAINER UNTIL THE FEATHER MEAL AND SOYBEAN MEAL ARE THOROUGHLY MIXED TO CREATE AN INGREDIENTS BLEND OPERATION 207, at least a portion of the feather meal and at least a portion of the soybean meal are mixed.

In one embodiment, at least a portion of the feather meal and at least a portion of the soybean meal are mixed for up to three minutes.

In one embodiment, once the feather meal and the soybean meal are thoroughly mixed at MIX THE FEATHER MEAL AND THE SOYBEAN MEAL IN THE MIXING CONTAINER UNTIL THE FEATHER MEAL AND SOYBEAN MEAL ARE THOROUGHLY MIXED TO CREATE AN INGREDIENTS BLEND OPERATION 207, operation flow proceeds to FILTER THE INGREDIENTS BLEND TO CREATE A FILTERED BLEND OPERATION 209.

In one embodiment, filtering includes screening.

In one embodiment, once the ingredients blend is filtered to create a filtered blend at FILTER THE INGREDIENTS BLEND TO CREATE A FILTERED BLEND OPERATION 209, operation flow proceeds to TRANSFER THE FILTERED BLEND TO A CONDITIONING UNIT OPERATION 211.

In one embodiment, once the filtered blend is transferred to a conditioning unit at TRANSFER THE FILTERED BLEND TO A CONDITIONING UNIT OPERATION 211, operation flow proceeds to HEAT THE FILTERED BLEND IN THE CONDITIONING UNIT TO A MINIMUM OF 130 DEGREES FAHRENHEIT TO CREATE A CONDITIONED BLEND OPERATION 213.

In one embodiment, at HEAT THE FILTERED BLEND IN THE CONDITIONING UNIT TO A MINIMUM OF 130 DEGREES FAHRENHEIT TO CREATE A CONDITIONED BLEND OPERATION 213, the filtered blend is mechanically heated.

In one embodiment, the conditioning unit is the same container as the mixing container. In one embodiment, process flow proceeds directly from MIX THE FEATHER MEAL AND THE SOYBEAN MEAL IN THE MIXING CONTAINER UNTIL THE FEATHER MEAL AND SOYBEAN MEAL ARE THOROUGHLY MIXED TO CREATE AN INGREDIENTS BLEND OPERATION 207 to HEAT THE FILTERED BLEND IN THE CONDITIONING UNIT TO A MINIMUM OF 130 DEGREES FAHRENHEIT TO CREATE A CONDITIONED BLEND OPERATION 213.

In one embodiment at HEAT THE FILTERED BLEND IN THE CONDITIONING UNIT TO A MINIMUM OF 130 DEGREES FAHRENHEIT TO CREATE A CONDITIONED BLEND OPERATION 213, the filtered blend is heated to a minimum of 130 degrees Fahrenheit, which is known to inhibit pathogenic bacterial growth of the most common pathogens such as *Escherichia coli* O157:H7 and *Salmonella*.

In one embodiment, the filtered blend is maintained in the conditioning unit at or above 130 degrees Fahrenheit for up to 30 minutes.

In one embodiment, filtration may be accomplished concurrently at HEAT THE FILTERED BLEND IN THE CONDITIONING UNIT TO A MINIMUM OF 130 DEGREES FAHRENHEIT TO CREATE A CONDITIONED BLEND OPERATION 213.

In one embodiment, once the filtered blend is heated to a minimum of 130 degrees Fahrenheit at HEAT THE FILTERED BLEND IN THE CONDITIONING UNIT TO A MINIMUM OF 130 DEGREES FAHRENHEIT TO CREATE A CONDITIONED BLEND OPERATION 213, the process flow proceeds to TRANSFER THE CONDITIONED BLEND TO A PELLET MILL OPERATION 215.

In one embodiment, once the conditioned blend is transferred to the pellet mill at TRANSFER THE CONDITIONED BLEND TO A PELLET MILL OPERATION 215, process flow proceeds to PROCESS THE CONDITIONED BLEND IN THE PELLET MILL TO CREATE A PELLETIZED BLEND OPERATION 216.

In one embodiment, once the conditioned blend is processed in the pellet mill to create the pelletized blend at PROCESS THE CONDITIONED BLEND IN THE PELLET MILL TO CREATE A PELLETIZED BLEND OPERATION 216, process flow proceeds to TRANSFER THE PELLETIZED BLEND TO A COOLER OPERATION 217.

In one embodiment, once the pelletized blend is transferred to the cooler at TRANSFER THE PELLETIZED BLEND TO A COOLER OPERATION 217, operation flow proceeds to COOL THE PELLETIZED BLEND TO A MOISTURE LEVEL RANGE OF 4%-20% BY PASSING PURIFIED OZONATED AIR THROUGH THE PELLETIZED BLEND TO CREATE COOLED PELLETS OPERATION 223.

In one embodiment, once the cooled pellets are created by passing purified ozonated air through the heated pelletized blend at COOL THE PELLETIZED BLEND TO A MOISTURE LEVEL RANGE OF 4%-20% BY PASSING PURIFIED OZONATED AIR THROUGH THE PELLETIZED BLEND TO CREATE COOLED PELLETS OPERATION 223, process flow proceeds to FILTER THE COOLED PELLETS TO CREATE A PELLET PRODUCT OPERATION 225.

In one embodiment, once the cooled pellets are filtered to create the pellet product at FILTER THE COOLED PELLETS TO CREATE A PELLET PRODUCT OPERATION 225, operation flow proceeds to TRANSFER THE PELLET PRODUCT TO A STORAGE AND/OR SHIPPING CONTAINER OPERATION 227.

In one embodiment, once the pellet product is transferred to the storage and/or shipping container at TRANSFER THE PELLET PRODUCT TO A STORAGE AND/OR SHIPPING CONTAINER OPERATION 227, operation flow proceeds to TEST THE PELLET PRODUCT FOR PATHOGENS OPERATION 229.

In one embodiment, once the pellet product is tested for pathogens at TEST THE PELLET PRODUCT FOR PATHOGENS OPERATION 229, operation flow proceeds to EXIT OPERATION 240.

Figure 3A:
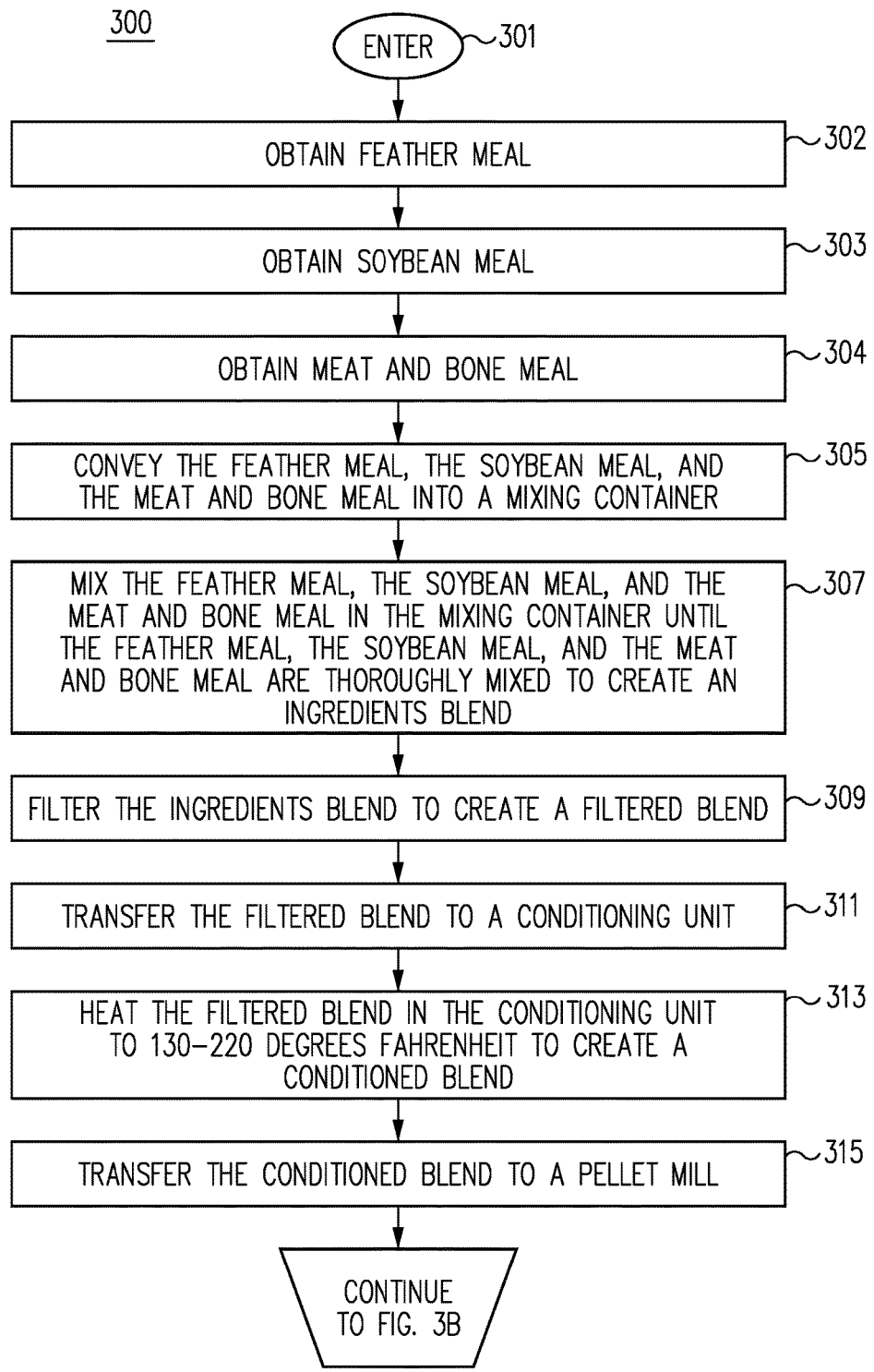
FIGS. 3A and 3B are a flow chart of a process for creating a pelleted feather meal, soybean meal, and meat and bone meal based organic fertilizer product, in accordance with one embodiment.
Figure 3B:
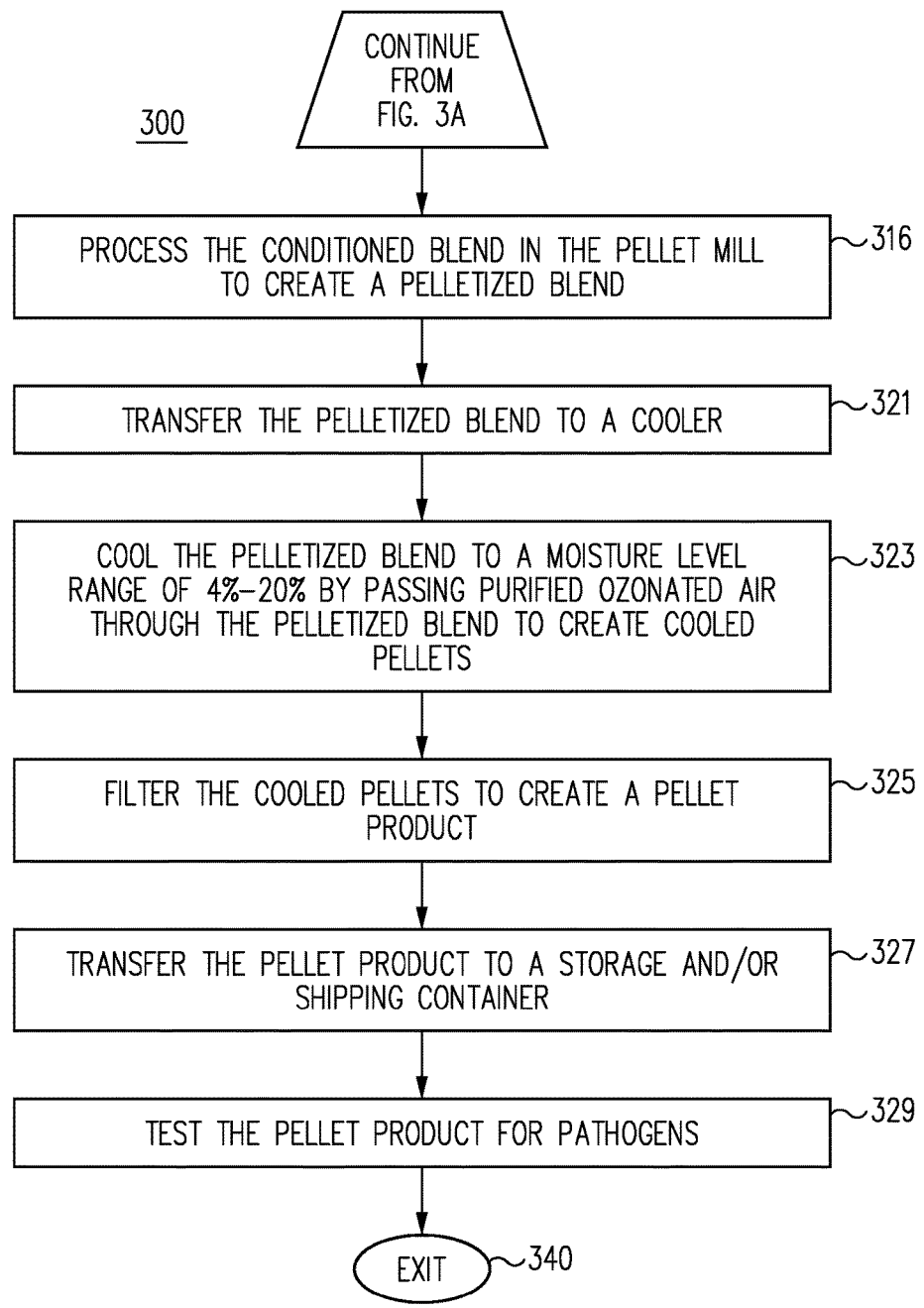

FIGS. 3A and 3B are a flow chart of a process for creating a feather meal, soybean meal, and meat and bone meal based organic fertilizer product from feather meal and soybean meal, in accordance with one embodiment. As shown in FIG. 3A, a process for creating a feather meal, soybean meal, and meat and bone meal based organic fertilizer product from feather meal, soybean meal, and meat and bone meal 300 begins at ENTER OPERATION 301 and process flow proceeds to OBTAIN FEATHER MEAL OPERATION 302.

In one embodiment, the feather meal of OBTAIN FEATHER MEAL OPERATION 302 includes a poultry processing byproduct comprised of poultry feathers.

In one embodiment, once the feather meal is obtained at OBTAIN FEATHER MEAL OPERATION 302, process flow proceeds to OBTAIN SOYBEAN MEAL OPERATION 303.

In one embodiment, the soybean meal of OBTAIN SOYBEAN MEAL OPERATION 303 is produced from soybeans.

In one embodiment, once the soybean meal is obtained at OBTAIN SOYBEAN MEAL OPERATION 303, process flow proceeds to OBTAIN MEAT AND BONE MEAL OPERATION 304.

The meat and bone meal of OBTAIN MEAT AND BONE MEAL OPERATION 304 includes, in various embodiments, a byproduct of animal rendering.

In one embodiment, once the meat and bone meal is obtained at OBTAIN MEAT AND BONE MEAL OPERATION 304, process flow proceeds to CONVEY THE FEATHER MEAL, THE SOYBEAN MEAL, AND THE MEAT AND BONE MEAL INTO A MIXING CONTAINER OPERATION 305.

In one embodiment, at CONVEY THE FEATHER MEAL, THE SOYBEAN MEAL, AND THE MEAT AND BONE MEAL INTO A MIXING CONTAINER OPERATION 305, at least a portion of the feather meal, at least a portion of the soybean meal, and at least a portion of the meat and bone meal are conveyed into the mixing container.

In one embodiment, the feather meal, the soybean meal, and the meat and bone meal are conveyed in quantities such that the resulting combination of the feather meal, the soybean meal, and the meat and bone meal is approximately 33% feather meal, approximately 33% soybean meal, and approximately 33% meat and bone meal. In one embodiment, the resulting combination is approximately 23% feather meal, approximately 23% soybean meal, and approximately 23% meat and bone meal. In one embodiment, the resulting combination is less than 99% of the feather meal. In one embodiment, the resulting combination is less than 99% of the soybean meal. In one embodiment, the resulting combination is less than 99% of the meat and bone meal.

In other embodiments, the feather meal, the soybean meal, and the meat and bone meal are conveyed in quantities such that the resulting combination of the feather meal, the soybean meal, and the meat and bone meal is any desired percentage concentration of the feather meal, the soybean meal, and the meat and bone meal, typically as determined by cost and the specific needs of the user.

In one embodiment, once the feather meal, the soybean meal, and the meat and bone meal are conveyed into the mixing container at CONVEY THE FEATHER MEAL, THE SOYBEAN MEAL, AND THE MEAT AND BONE MEAL INTO A MIXING CONTAINER OPERATION 305, process flow proceeds to MIX THE FEATHER MEAL, THE SOYBEAN MEAL, AND THE MEAT AND BONE MEAL IN THE MIXING CONTAINER UNTIL THE FEATHER MEAL, THE SOYBEAN MEAL, AND THE MEAT AND BONE MEAL ARE THOROUGHLY MIXED TO CREATE AN INGREDIENTS BLEND OPERATION 307.

According to one embodiment, at MIX THE FEATHER MEAL, THE SOYBEAN MEAL, AND THE MEAT AND BONE MEAL IN THE MIXING CONTAINER UNTIL THE FEATHER MEAL, THE SOYBEAN MEAL, AND THE MEAT AND BONE MEAL ARE THOROUGHLY MIXED TO CREATE AN INGREDIENTS BLEND OPERATION 307, at least a portion of the feather meal, at least a portion of the soybean meal, and at least a portion of the meat and bone meal are mixed.

In one embodiment, at least a portion of the feather meal, at least a portion of the soybean meal, and at least a portion of the meat and bone meal are mixed for up to three minutes.

In one embodiment, once the feather meal, the soybean meal, and the meat and bone meal are thoroughly mixed at MIX THE FEATHER MEAL, THE SOYBEAN MEAL, AND THE MEAT AND BONE MEAL IN THE MIXING CONTAINER UNTIL THE FEATHER MEAL, THE SOYBEAN MEAL, AND THE MEAT AND BONE MEAL ARE THOROUGHLY MIXED TO CREATE AN INGREDIENTS BLEND OPERATION 307, operation flow proceeds to FILTER THE INGREDIENTS BLEND TO CREATE A FILTERED BLEND OPERATION 309.

In one embodiment, at FILTER THE INGREDIENTS BLEND TO CREATE A FILTERED BLEND OPERATION 309, a stainless steel, or other suitable material, mesh having a mesh size number between 50 and 200 may be employed to filter the ingredients blend. In one embodiment, the mesh size is 200.

In one embodiment, once the ingredients blend is filtered to create a filtered blend at FILTER THE INGREDIENTS BLEND TO CREATE A FILTERED BLEND OPERATION 309, operation flow proceeds to TRANSFER THE FILTERED BLEND TO A CONDITIONING UNIT OPERATION 311.

In one embodiment, once the filtered blend is transferred to a conditioning unit at TRANSFER THE FILTERED BLEND TO A CONDITIONING UNIT OPERATION 311, operation flow proceeds to HEAT THE FILTERED BLEND IN THE CONDITIONING UNIT TO A MINIMUM OF 130 DEGREES FAHRENHEIT TO CREATE A CONDITIONED BLEND OPERATION 313.

In one embodiment, at HEAT THE FILTERED BLEND IN THE CONDITIONING UNIT TO A MINIMUM OF 130 DEGREES FAHRENHEIT TO CREATE A CONDITIONED BLEND OPERATION 313, the filtered blend is mechanically heated.

In one embodiment, the conditioning unit is the same container as the mixing container. In one embodiment, process flow proceeds directly from MIX THE FEATHER MEAL, THE SOYBEAN MEAL, AND THE MEAT AND BONE MEAL IN THE MIXING CONTAINER UNTIL THE FEATHER MEAL, THE SOYBEAN MEAL, AND THE MEAT AND BONE MEAL ARE THOROUGHLY MIXED TO CREATE AN INGREDIENTS BLEND OPERATION 307 to HEAT THE FILTERED BLEND IN THE CONDITIONING UNIT TO A MINIMUM OF 130 DEGREES FAHRENHEIT TO CREATE A CONDITIONED BLEND OPERATION 313.

In one embodiment at HEAT THE FILTERED BLEND IN THE CONDITIONING UNIT TO A MINIMUM OF 130 DEGREES FAHRENHEIT TO CREATE A CONDITIONED BLEND OPERATION 313, the filtered blend is heated to a minimum of 130 degrees Fahrenheit, which is known to inhibit pathogenic bacterial growth of the most common pathogens such as *Escherichia coli* O157:H7 and *Salmonella*.

In one embodiment, the filtered blend is maintained in the conditioning unit at or above 130 degrees Fahrenheit for up to 30 minutes.

In one embodiment, filtration may be accomplished concurrently at HEAT THE FILTERED BLEND IN THE CONDITIONING UNIT TO A MINIMUM OF 130 DEGREES FAHRENHEIT TO CREATE A CONDITIONED BLEND OPERATION 313.

In one embodiment, once the filtered blend is heated to a minimum of 130 degrees Fahrenheit at HEAT THE FILTERED BLEND IN THE CONDITIONING UNIT TO A MINIMUM OF 130 DEGREES FAHRENHEIT TO CREATE A CONDITIONED BLEND OPERATION 313, the process flow proceeds to TRANSFER THE CONDITIONED BLEND TO A PELLET MILL OPERATION 315.

In one embodiment, once the conditioned blend is transferred to the pellet mill at TRANSFER THE CONDITIONED BLEND TO A PELLET MILL OPERATION 315, process flow proceeds to PROCESS THE CONDITIONED BLEND IN THE PELLET MILL TO CREATE A PELLETIZED BLEND OPERATION 316.

In one embodiment, once the conditioned blend is processed in the pellet mill to create the pelletized blend at PROCESS THE CONDITIONED BLEND IN THE PELLET MILL TO CREATE A PELLETIZED BLEND OPERATION 316, process flow proceeds to TRANSFER THE PELLETIZED BLEND TO A COOLER OPERATION 321.

In one embodiment, once the pelletized blend is transferred to the cooler at TRANSFER THE PELLETIZED BLEND TO A COOLER OPERATION 321, operation flow proceeds to COOL THE PELLETIZED BLEND TO A MOISTURE LEVEL RANGE OF 4%-20% BY PASSING PURIFIED OZONATED AIR THROUGH THE PELLETIZED BLEND TO CREATE COOLED PELLETS OPERATION 323.

In one embodiment, once the cooled pellets are created by passing purified ozonated air through the heated pelletized blend at COOL THE PELLETIZED BLEND TO A MOISTURE LEVEL RANGE OF 4%-20% BY PASSING PURIFIED OZONATED AIR THROUGH THE PELLETIZED BLEND TO CREATE COOLED PELLETS OPERATION 323, process flow proceeds to FILTER THE COOLED PELLETS TO CREATE A PELLET PRODUCT OPERATION 325.

In one embodiment, once the cooled pellets are filtered to create the pellet product at FILTER THE COOLED PELLETS TO CREATE A PELLET PRODUCT OPERATION 325, operation flow proceeds to TRANSFER THE PELLET PRODUCT TO A STORAGE AND/OR SHIPPING CONTAINER OPERATION 327.

In one embodiment, once the pellet product is transferred to the storage and/or shipping container at TRANSFER THE PELLET PRODUCT TO A STORAGE AND/OR SHIPPING CONTAINER OPERATION 327, operation flow proceeds to TEST THE PELLET PRODUCT FOR PATHOGENS OPERATION 329.

In one embodiment, once the pellet product is tested for pathogens at TEST THE PELLET PRODUCT FOR PATHOGENS OPERATION 329, operation flow proceeds to EXIT OPERATION 340.

Using the processes described above, a pelleted feather meal and soybean meal based organic fertilizer product is provided that is environmentally benign; is non-pathogenic; is derived from natural organic sources; does not require significant processing; has minimal odor; is easily handled and applied in pellet form; can be applied directly to soil supporting agricultural vegetation; includes time-released nitrogen components which become bioavailable to agricultural vegetation by beneficial microbial digestion in soil; and eliminates chemical crop burning.

It should be noted that the language used in the specification has been primarily selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the figures are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A pelleted feather meal, soybean meal, and meat and bone meal based organic fertilizer product, wherein the pelleted feather meal, soybean meal, and meat and bone meal based organic fertilizer product is produced from a process including:
   obtaining a quantity of feather meal;
   obtaining a quantity of soybean meal;
   obtaining a quantity of meat and bone meal;
   combining at least part of the quantity of the feather meal, at least part of the quantity of the soybean meal, and at least part of the quantity of meat and bone meal to create a combination of feather meal, soybean meal, and meat and bone meal, where the combination of feather meal and soybean meal is at least 70% of the entire combination; and
   processing the combination of feather meal, soybean meal, and meat and bone meal to create a pelletized blend feather meal and soybean meal based organic fertilizer product.

2. The pelleted feather meal, soybean meal, and meat and bone meal based organic fertilizer product of claim 1, wherein combining the at least part of the quantity of the feather meal, the at least part of the quantity of the soybean meal, and the at least part of the quantity of the meat and bone meal to create the combination of feather meal, soybean meal, and meat and bone meal further comprises mixing the at least part of the quantity of the feather meal, the at least part of the quantity of the soybean meal, and the at least part of the quantity of the meat and bone meal until the at least part of the quantity of the feather meal, the at least part of the quantity of the soybean meal, and the at least part of the quantity of the meat and bone meal are thoroughly mixed.

3. The pelleted feather meal, soybean meal, and meat and bone meal based organic fertilizer product of claim 1, wherein the process for producing the pelleted feather meal, soybean meal, and meat and bone meal based organic fertilizer product further comprises:
filtering the combination of feather meal, soybean meal, and meat and bone meal.

4. The pelleted feather meal, soybean meal, and meat and bone meal based organic fertilizer product of claim 1, wherein the process for producing the pelleted feather meal, soybean meal, and meat and bone meal based organic fertilizer product further comprises:
heating the combination of feather meal, soybean meal, and meat and bone meal.

5. The pelleted feather meal, soybean meal, and meat and bone meal based organic fertilizer product of claim 1, wherein the process for producing the pelleted feather meal, soybean meal, and meat and bone meal based organic fertilizer product further comprises:
heating the combination of feather meal, soybean meal, and meat and bone meal to a minimum of 130 degrees Fahrenheit.

6. The pelleted feather meal, soybean meal, and meat and bone meal based organic fertilizer product of claim 1, wherein processing the combination of feather meal, soybean meal, and meat and bone meal to create a pelletized blend includes processing the combination of feather meal, soybean meal, and meat and bone meal in a pellet mill.

7. The pelleted feather meal, soybean meal, and meat and bone meal based organic fertilizer product of claim 1, wherein the process for producing the pelleted feather meal, soybean meal, and meat and bone meal based organic fertilizer product further comprises:
heating the pelletized blend; and
cooling the heated pelletized blend to a moisture level of 4%-20% by passing purified ozonated air through the heated pelletized blend.

8. The pelleted feather meal, soybean meal, and meat and bone meal based organic fertilizer product of claim 1, wherein the process for producing the pelleted feather meal, soybean meal, and meat and bone meal based organic fertilizer product further comprises:
filtering the pelletized blend.

9. The pelleted feather meal, soybean meal, and meat and bone meal based organic fertilizer product of claim 1, wherein the process for producing the pelleted feather meal, soybean meal, and meat and bone meal based organic fertilizer product further comprises:
heating the pelletized blend to a minimum of 130 degrees Fahrenheit.

10. The pelleted feather meal, soybean meal, and meat and bone meal based organic fertilizer product of claim 1, wherein the process for producing the pelleted feather meal, soybean meal, and meat and bone meal based organic fertilizer product further comprises:
testing the pelletized blend for pathogens.

11. A process of fertilization using a pelleted feather meal and soybean meal based organic fertilizer product comprising:
obtaining a quantity of pelletized feather meal and soybean meal organic fertilizer product, wherein the pelletized feather meal and soybean meal fertilizer product includes a combination of feather meal and soybean meal, where the combination of feather meal and soybean meal is at least 70% of the entire combination; and
applying the pelleted feather meal and soybean meal based organic fertilizer product to soil surrounding vegetation.

12. The process of fertilization using the pelleted feather meal and soybean meal based organic fertilizer product of claim 11, wherein the pelletized feather meal and soybean meal fertilizer product includes a meat and bone meal.

13. The process of fertilization using a pelleted feather meal and soybean meal based organic fertilizer product of claim 11, wherein the combination of feather meal and soybean meal has been prepared by:
obtaining a quantity of feather meal;
obtaining a quantity of soybean meal;
combining at least part of the quantity of the feather meal and at least part of the quantity of the soybean meal to create the combination of feather meal and soybean meal; and
processing the combination of feather meal and soybean meal to create a pelletized blend.

14. The process of fertilization using the pelleted feather meal and soybean meal based organic fertilizer product of claim 13, wherein the at least part of the quantity of the feather meal and the at least part of the quantity of the soybean meal have been mixed until the at least part of the quantity of the feather meal and the at least part of the quantity of the soybean meal were thoroughly mixed.

15. The process of fertilization using the pelleted feather meal and soybean meal based organic fertilizer product of claim 13, wherein the combination of feather meal and soybean meal has been filtered.

16. The process of fertilization using the pelleted feather meal and soybean meal based organic fertilizer product of claim 13, wherein the combination of feather meal and soybean meal has been heated to a minimum of 130 degrees Fahrenheit.

17. The process of fertilization using the pelleted feather meal and soybean meal based organic fertilizer product of claim 13, wherein the combination of feather meal and soybean meal has been processed in a pellet mill to create a pelletized blend.

18. The process of fertilization using the pelleted feather meal and soybean meal based organic fertilizer product of claim 13, wherein:
the pelletized blend has been heated; and
the heated pelletized blend has been cooled to a moisture level of 4%-20% by passing purified ozonated air through the heated pelletized blend.

19. The process of fertilization using the pelleted feather meal and soybean meal based organic fertilizer product of claim 13, wherein the pelletized blend has been filtered.

* * * * *